United States Patent Office 3,684,540
Patented Aug. 15, 1972

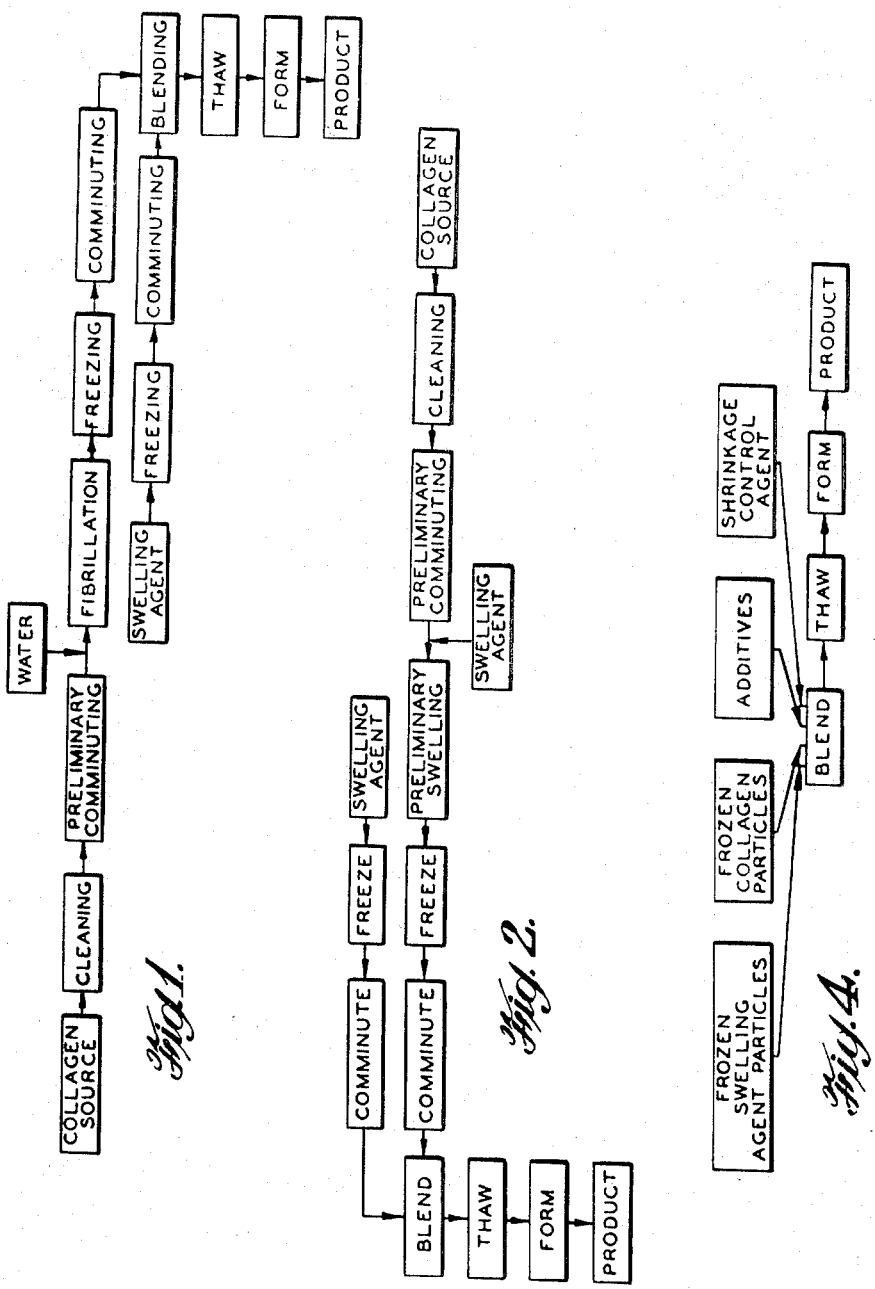

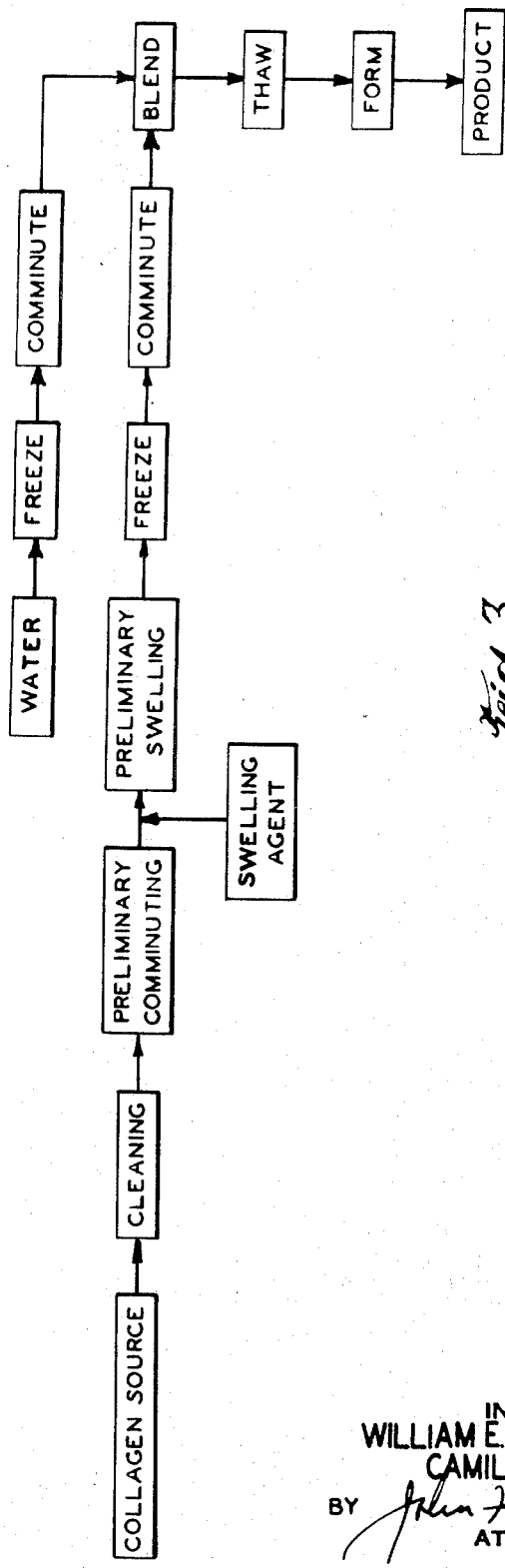

3,684,540
FREEZING-MIXING PROCESS
William E. Henderson, 6411 Lane Court, and Camilla B. Ross, 5502 S. Madison St., both of Hinsdale, Ill. 60521
Application Sept. 14, 1967, Ser. No. 667,849, which is a continuation of application Ser. No. 414,969, Dec. 1, 1964. Divided and this application Dec. 24, 1970, Ser. No. 101,376
Int. Cl. C08b 21/00
U.S. Cl. 106—164
6 Claims

ABSTRACT OF THE DISCLOSURE

Materials which are normally reactive with each other can be mixed together in particulate form when one of the normally reactive materials is first rendered inactive by freezing. A uniform blend of the materials can then be obtained and the frozen component of the blend can subsequently be thawed and the materials be permitted to react with each other.

---

This is a division of application Ser. No. 667,849 filed Sept. 14, 1967, now U.S. Pat. No. 3,551,535 issued Dec. 29, 1970, which was a continuation of application Ser. No. 414,969, filed Dec. 1, 1964, now abandoned.

This invention relates to the mixing of a plurality of materials and particularly to the mixing of materials, at least one of which is normally liquid, by freezing and then mixing the materials while in a solid, free-flowing particulate state.

The production of homogeneous mixtures of reactive materials is frequently replete with problems. For example, in the preparation of collagen-liquid blends in which the amount of liquid present in the blend is less than that which the collagen is capable of imbibing, uniform distribution of the liquid within the collagen mass and, consequently, uniform swelling of the collagen is, at best, extremely difficult to attain. The tendency is for the first portions of the collagen contacted by the liquid to rapidly imbibe to their capacity thus consuming the liquid before other portions of collagen can be brought into contact with the liquid. The resultant collagen-liquid blend would then be characterized by a portion of the collagen containing essentially all of the swelling agent and another portion in which the collagen would be in the form of lumps of unswollen collagen which lumps would usually be matted together and encapsulated by viscous, swollen collagen.

Homogenization of a collagen-liquid blend is extremely difficult due to the high viscosity of the blend and the susceptibility of the collagen to be degraded by the local frictional heat produced by the high shear forces which are concomitant with mixing. Furthermore, air entrapped during mixing is very difficult to remove, and bubbles or voids may result in the products made from the mixture.

In an application where a material, such as a fiber, is to be added to viscous collagen-liquid blends, zones of high fiber concentration or even zones of fiber agglomeration rather than uniform fiber distribution are difficult to avoid in the resultant blend.

When extruding tubing, films, sheets and the like, high collagen concentration in such blends is important in order to provide rapid coagulation and/or drying, and to avoid the handling of extremely delicate gel films immediately following extrusion. Processing of high solids concentration compositions by the methods currently being practiced, can result in degradation or denaturation to such an extent that the resultant products are not satisfactory.

It is an object of this invention, therefore, to overcome the problems previously encountered in forming collagen-liquid blends.

This and further objects of the present invention will become more apparent in light of the ensuing description thereof.

In general, the objects of the present invention can be accomplished by mixing a plurality of materials which are normally reactive with each other under such conditions that the materials will not interact during mixing. At a later stage, reaction of the thusly intermixed materials is permitted to occur.

More specifically, the objects of the present invention can be accomplished by separately freezing at least one normally liquid component of a plurality of materials which are reactive with each other, mixing the plurality of materials while in the inactive form and in the form of free-flowing particles until a uniformly mixed blend of the materials is obtained and then thawing the blend to permit the uniformly intermixed materials to interact, or to permit further processing as required or desired.

As used thoughout the specification and in the appended claims, the term "reactive" is meant to include and should be understood as including chemical or physical action or both occurring when two or more materials are brought together. For example, the swelling of collagen, when in contact with acid, base, or salt is primarily a physical phenomenon as is forming a solution, whereas the effect of a tanning agent in collagen is primarily a chemical phenomenon. In the sense of this description, collagen and the swelling agent as well as collagen and a tanning agent are reactive with each other. Conversely, the term "inactive" as used throughout this specification and in the appended claims signifies that reaction, chemical or physical, does not occur between the materials.

Similarly, the term "thawing" should be understood as referring to the act of reducing a frozen substance to its normal liquid state by raising its temperature above the melting point of the substance.

The term "plurality of materials," as used throughout the specification and in the appended claims, should also be understood as and is intended to refer to a mixture of two or more materials at least two of which are normally reactive with each other and one component of which is a liquid in its normal state.

The particle size required for proper intermixing of the materials of the present invention can be obtained either in a single operation, such as spray freezing, or in a plurality of operations, such as freezing followed by comminuting.

In the production of shaped structures, such as tubes, sheets, films, and filaments of collagen, free-flowing particles containing unswollen or partly swollen collagen are mixed with frozen particles of a swelling agent. After a uniform, free flowing blend is obtained, the ingredients of the mixture are permitted to thaw and interact by raising the temperature thus causing the collagen to be swollen by the swelling agent. The swollen mass can then be extruded or shaped to form the desired structure.

In another embodiment, free-flowing particles containing partly swollen collagen can be mixed with ice particles and the collagen be caused to further swell upon thawing of the ice particles, provided sufficient swelling agent is already present in the partly swollen collagen particles.

Use of the term "free-flowing" throughout the specification and in the appended claims should be understood as referring and is intended to refer to the particulate, solid state of a substance which can be poured or stirred.

Collagen-containing particles which are free-flowing particles at the temperature of operation can be obtained either from a collagen mass which is sufficiently dry to yield free-flowing particles or from frozen collagen.

The term "frozen collagen," as employed throughout this specification and in the appended claims, is intended to mean the solid state of collagen which can be obtained by lowering the temperature and freezing the liquid constituent of a collagen-containing mass.

The objects and advantages of the invention will be more fully appreciated and the invention will be better understood from the following description when considered in conjunction with the accompanying drawing wherein:

FIG. 1 is a flow diagram illustrating one embodiment of the present invention;

FIG. 2 is a flow diagram illustrating another embodiment of the invention;

FIG. 3 is a flow diagram illustrating a further embodiment of the invention; and FIG. 4 is a flow diagram illustrating still another embodiment of the invention.

As shown in FIG. 1, a collagen-containing tissue, as for example, tendon or fresh or limed animal hide is cleaned by methods well known to those skilled in the art and then comminuted. Such collagen tissues normally contain about 25% to 35% collagen on a dry weight basis. The comminution is preferably performed at a low temperature through the use of a coolant such as ice and can be carried out by any known method, such as in a conventional meat grinder or by dicing.

The comminuted collagen can then be mixed with a liquid coolant such as water. The collagen does not imbibe the liquid to such an extent as to form a viscous blend unless a swelling agent is present. Thus, the collagen can be diluted with water to yield, for example, a 10 percent dry solids mixture, but the mixture would be characterizable as a liquid suspension rather than an extrudable or formable viscous composition. The term "extrudable" or "formable composition," as used throughout the specification and in the appended claims, is intended to refer to the ability to process a mixture in conventional equipment and obtain a formed structure therefrom.

A fibrillation operation is then carried out as, for example, in an apparatus normally used to prepare meat emulsions. The term "fibrillation," as employed throughout the specification and in the appended claims, is intended to refer to the act of subdividing collagen into a suspension of fibrous particles.

The fibrillated collagen can then be frozen by any conventionally known system. In order to minimize agglomeration of the fibrillated collagen, it is preferred that a refrigerant, such as solid carbon dioxide (Dry Ice), liquid air or nitrogen, and the like, be mixed with collagen. The collagen can also be frozen and ground to particulate form by mixing the collagen with Dry Ice and passing the mixture through a mechanical grinder to form frozen particles.

For the preparation of extrudable or formable collagen compositions of the proper concentrations for use in producing sausage casing or other formed structures, the collagen must be mixed with a swelling agent. As has been described hereinabove, the swelling agent can also be incorporated in preswollen collagen particles so that when such particles are mixed with water, further swelling of the collagen will occur. The term "swelling agent" as used throughout this application and in the appended claims, should be understood as referring to and is intended to include those materials which will cause collagen to imbibe appreciable amounts of fluids over and above the normal moisture content of collagen.

Any of the known swelling agents, such as dilute acids, dilute alkalis and salts, and the like, can be used. Preferred swelling agents are dilute solutions of hydrochloric, lactic and acetic acids.

The swelling agent solution can be frozen by any known means. For example, a refrigerant, such as Dry Ice, can be mixed with the solution to cause freezing. The frozen swelling agent is comminuted to the desired particle size while maintained in the frozen state as, for example, by means of a mechanical grinder which is cooled.

The frozen collagen and swelling agent particles are then mixed and thoroughly blended to form a homogeneous mixture of particles. The ratio of collagen to swelling agent should be such that the thawed-blended product contains at least about 3% collagen on a dry weight basis, and preferably from about 6% to 12% collagen.

The swelling agent is then absorbed by the collagen as the finely divided frozen particles are allowed to thaw. The thawed, homogeneous blend can then be extruded or formed into the desired product shape.

Another embodiment of the invention which is particularly suitable for hide collagen is shown in FIG. 2. Cleaned collagen-containing hide tissue is comminuted to form gross pieces (e.g., 1 inch x 1 inch x ⅛ inch) and preswollen as is more fully described hereinafter. The preswollen collagen is frozen and then ground while in the frozen state to a fibrous powder.

In a separate operation, the swelling agent is frozen and, while maintained in the frozen state, comminuted to the desired particle size.

The frozen collagen and swelling agent particles are then mixed to form a blend. The relative proportions of the collagen and swelling agent particles are such that upon thawing, an extrudable or formable composition of the desired solids content is obtained. The blend is then thawed to obtain an extrudable or formable composition. The thawed, homogeneous blend can then be extruded or formed into the desired product shape.

For example, in the fabrication of sausage casings, it has been found that an extruded casing can be readily obtained from a composition having a collagen solids content of from about 5% to 20%, preferably from about 7% to 14%. However, it should be understood that other products can also be obtained from compositions having a higher collagen solids content of up to about 35% such as by calendering the higher collagen containing compositions to fabricate such articles as shoes, gloves, and the like. Similarly, other products can also be obtained from compositions having a collagen solids content as low as about 1% such as by extruding the low collagen containing composition into a liquid coagulating bath to fabricate thin membranes which can be used as medical bandages, textile materials, and the like. Hence, the amount of solids that can be present in these formable or extrudable compositions will be generally dependent upon the type and nature of product desired or required to be obtained.

In FIG. 3, there is illustrated still another embodiment of the present invention which is similar to that shown and described in connection with FIG. 2 above. However, in the separate operation depicted in FIG. 3, water is frozen and then comminuted to the desired particle size while in the frozen state. The particles of pre-swollen, frozen collagen are then mixed with ice particles to form a blend and the remainder of the procedure is the same as that set forth hereinabove with regard to FIG. 2.

The typical examples of procedures for producing frozen blends of free-flowing particles, described and shown in FIGS. 1, 2 and 3, are admirably suitable in connection with the production of formed products containing additives homogeneously incorporated therein.

Use of the term "additive," as employed throughout this specification and in the appended claims, should be understood as including and is intended to refer to those materials well known to those skilled in the art which can be utilized to impart a particular characteristic or property to the collagen structure obtained. Illustrative of these additives are such materials as coloring agents such as dyes and pigments, diluents, pore formers, blowing agents, flavoring agents, hardening agents and the like.

The production of collagen structures containing non-shrinking material is also greatly facilitated by the procedures described and shown in FIGS. 1, 2 and 3.

Non-shrinking materials are those which affect and which are used to control the shrinkage characteristics of formed collagen structures. Such shrinkage control is of importance in casings for some types of sausage, such as pork sausage, which should be subjected to controlled shrinkage to insure proper performance during the frying process.

Shrinkage control agents include: natural and synthetic fibers such as cellulose, cotton and rayon; and other natural or synthetic materials such as alginates and starches; and the like.

As shown in FIG. 4, a shrinkage control agent and/or an additive can be added to and homogeneously blended with the frozen collagen material and frozen swelling agent. In this way, the usual agglomeration problem encountered when incorporating materials into viscous fluids is avoided and the final collagen dispersion for extrusion into casing contains uniformly dispersed therein individual particles or fibers of the additive and/or shrinkage control agent.

In the embodiment wherein non-heat shrinking polymers are used, they are first converted to a solution or dispersion which is then frozen and ground to a fine particle size prior to mixing with the frozen swelling agent. It is preferred to employ the shrinkage control agent in an amount of from about 5% to 35%, based on the weight of dry collagen. Short length fibers and, more particularly, cellulosic fibers ½ to 3 millimeters (mm.) in length, are the preferred shrinkage control agents.

The additive or shrinkage control agent can also be added to and blended with a previously prepared blend of frozen collagen particles and swelling agent.

Another embodiment involves dispersing the additive or shrinkage-control agent in one component of the system prior to freezing and comminuting the component. For example, fibers can be dispersed in a swelling agent solution, the swelling agent frozen, and then the frozen mass comminuted and blended with free-flowing collagen-containing particles.

A further embodiment which can be employed involves the preparation by any method of a viscous swollen collagen composition containing the desired solids concentration. The viscous mass is then frozen, reduced to the required particle size and blended with solid additive particles or fibers.

It should be noted that freezing of the collagen is necessary in those cases where the collagen contains sufficient liquid to prevent it from attaining a solid, free-flowing particulate form without freezing. In those cases where sufficiently dried collagen is employed, the unfrozen collagen particles can be blended directly with the frozen swelling agent particles under conditions which prevent thawing of the swelling agent but which do not necessarily cause freezing of the collagen.

In yet another embodiment, the frozen collagen particles can also be obtained by freezing cleaned, unswollen tendon or hide collagen and then comminuting. Tissue derived from the low temperature rendering of lard can also be frozen and comminuted to provide the frozen collagen particles.

It is preferred that all process steps of the methods described herein such as comminution, swelling, dispersing, extrusion or forming of the collagen, be conducted at temperatures not to exceed 15° C., in order to minimize degradation.

The following examples are set forth as illustrative embodiments of the present invention and are not intended in any way, to indicate the limits of the invention. Parts and percentages, unless indicated otherwise, are by weight.

EXAMPLE I

Forty-five pounds (lbs.) of limed beef hide, with the grain and flesh layers removed, were cut into 8 inch wide strips varying in length from three to five feet. Limed beef hide, in this instance, refers to a salted beef hide which, after salt removal, has been dehaired by a lime-sodium hydrosulfide treatment. The strips were fed into a dicer. Except during the cutting step, the hide was refrigerated and protected to reduce degradation and dehydration. The diced hide (½ inch square pieces) was washed in a stainless steel tumbling washing machine at twelve r.p.m. for a total of 7 hours with 6 liters per minute running water overflow at 15° C. Ten lbs. (4536 gms.) of the washed hide were leached and partially swollen by soaking in a hydrochloric acid solution maintained at a pH of 1 for 8 hours at 15° C. and stirred manually every 15 minutes. The acid treated hide was washed with water to a constant pH of 3 in the wash water. The acid-treated hide was frozen by mixing it with ground Dry Ice in a tumbler. The frozen hide was then ground in the presence of Dry Ice to a fine powder in a rotary knife grinder of a type used to granulate plastics, employing a plate having $\frac{3}{32}$ inch holes. An aqueous hydrochloric acid solution (pH 3) was frozen and ground in the same manner using Dry Ice. The powdered hide and 17 lbs. (7718 gms.) of the powdered acid solution were blended with 0.53 lb. (241 gms.) of 1 denier, ¾ mm. long rayon fibers that had been sifted through a 20 mesh screen. The blending was carried out in a tumbler equipped with a high-speed agitator and cooled to prevent premature thawing of the frozen particles. The blend was stored in a freezer maintained at −25° C. to allow the Dry Ice to sublime. The proportions named were selected to produce a 10% dry solids dispersion.

The frozen, ground, uniformly mixed blend of acid particles and collagen particles and rayon fibers was fed to a screw extruder, such as used for thermoplastic extrusions, the hopper section of which was maintained at a temperature of about −40° C. by circulating cold alcohol in the cooling jacket surrounding the feeding zone. The forward sections of the extruder were maintained at a temperature of about 5° C. thus permitting thawing while minimizing thermal degradation.

The screw conveyed the mixture of frozen particles forward to the thawing zone where de-aeration occurred, as in the case of plastic extrusion, in which the particles were subjected to increasing packing forces as they advanced through the constricted portions of the passage in the extruder. The air forced out flowed back through the free spaces between frozen particles.

The mixing and shearing action of the screw provided homogenization of the resultant, highly viscous dispersion without air entrapment. The resultant mass was translucent and did not have the variable opacity associated with the usual nonuniformly swollen dispersions. The uniform swelling of the collagen is attributable to the uniform distribution of swelling agent prior to the initiating of the swelling action (at the time of thawing).

A filtering device, in which the dispersion is forced through 0.003 inch slots, was used following the screw extruder. This device served to remove any foreign particles and to remove or shred apart any lumps which might clog the extrusion nozzle. A gear pump (following the filtering device) was used to meter the dispersion out of the extruder-filter system and feed it to an extrusion die at a uniform rate of 11 cubic centimeters/minute (cc./min.).

The dispersion was extruded through a rotary die having an 0.007 inch annular orifice to produce a casing, ¾ inch in diameter. The casing was extruded into air and subsequently passed into an atmosphere containing ammonia to neutralize the acid present in the casing. The casing moisture content was reduced to a point wherein it could be reopened after passing through nip rolls. The flattened tubing, after passing through nip rolls, was washed with cold running water for about 10 minutes, and thereafter glycerinated (7.5% glycerine in water for about 3 min.) to obtain a concentration of 20% by weight of glycerine in the finished film. The tubing was dried in the inflated state in lengths of about 25 feet and, after drying, had an average wall thickness of about 0.0015 inch. To further harden the dried casing, it was grandually heated under vacuum over a six hour period to 100° C. and then held under vacuum at 100° C. for 19 hours.

This casing was then stuffed with standard commercial pork sausage and then fried in a covered electric fry pan in the following manner: Three tablespoons of water were added to the cold fry pan, the sausages were placed in the pan and covered. The pan was then heated to 300° F. and, after five minutes, the cover was removed. The sausages were turned in the pan until brown. During frying, the casing did not split, nor was meat exposed or extruded from the ends of the individual encased sausage. The casing conformed to the meat to result in a pleasing, attractive product. No flavor was imparted to the sausage by the casing. The casing was readily comestible with the meat.

EXAMPLE II

Fresh, nonbifurcated, deep flexor bovine tendons were manually cleaned and scraped to remove adhering refuse such as tendon sheath, fat, hair and the like. 2400 grams of the cleaned tendon were then mixed with 2300 gms. of crushed ice and ground in a conventional meat grinder. A plate with ⅜ inch holes was used for the first pass through the grinder and a plate with ⅛ inch holes for the second pass. The temperature, as measured with a glass thermometer inserted into the mass, was 0° C. The mixture had the apperance of white coarsely ground meat.

2300 grams of ice cold water were added to the ground collagen by manual mixing.

The collagen mixture was then passed four times through a meat emulsifier which had been precooled to about 5° C. with ice. The emulsifier was equipped with a plate having holes 1.7 millimeter (mm.) in diameter, and a high speed cutting head. Precooling of the meat emulsifier and the collagen emulsion prevented the temperature of the collagen mass from rising above 15° C. when passed through the meat emulsifier. The fibrillated collagen mass was a dough-like suspension of collagen fibers in water.

The resultant, fibrillated collagen showed, under microscopic examination, a shrink temperature essentially identical to that of tendon (66° to 68° C.) which indicated there had been no substantial degradation.

The term "shrink temperature" refers to the temperature at which the collagen fibers, in contact with water, contract to about one-third to one-quater of their initial length.

3500 grams of thus-prepared fibrillated collagen were frozen by mixing it with ground Dry Ice. A dilute lactic acid solution (69 gms. of 85% lactic acid in 2917 milliliters (ml.) of water) was separately frozen in a freezer which was at −25° C.

The frozen collagen was ground, in the presence of Dry Ice, to form discrete, non-adhering particles in a rotary knife-type grinder (of the type used to granulate plastic) employing a plate having 5⁄16 inch holes during a first pass and a plate having ⅛ inch holes during a second pass. The dilute acid, in sufficient quantity to yield a 9% solids dispersion, was similarly ground in the presence of Dry Ice to a fine powder and blended (still in the presence of Dry Ice) with the ground, frozen collagen. The blending was carried out in a tumbler equipped with a high-speed agitator and cooled to prevent premature thawing of the frozen particles. The extrusion was similar to that of Example I except that a ¾ inch stationary die with a 0.010 inch annular orifice was used.

The extrusion of the dispersion having a 9% by weight solids content through a circular die having a 0.010 inch annular orifice at a discharge rate of 30 cubic centimeter/ minute (cc./min.) produced self-supporting lengths of collagen tubing.

EXAMPLE III

The process of Example II was followed, except in that 33 gms. of cotton fibers averaging about 0.5 to 2.0 millimeters in length, were sifted through a 20 mesh screen into a blender containing 1402 gms. of premixed, frozen collagen and swelling agent. Collagen casings made from a homogeneous dispersion of the mixture by extrusion revealed uniform fiber distributions under microscopic examinations.

EXAMPLE IV

The method of Example II was follower, except in that the extruder discharge rate was reduced from 30 cc./ min. to 12 cc./min. through the use of the previously mentioned gear pump between the extruder and nozzle.

The dwell time of the collagen in the extruder was increased by slowing down the gear pump which meters the rate of the dispersion flow out of the extruder. The homogenization of the collagen-swelling agent mixture was thus increased without increasing the shear rate applied to the mixture by the screw (i.e., the speed of the screw).

A rapid test for degradation is provided by measuring the self-supporting length of a rod or tube extruded into air. Since the length varies inversely with the degree of degradation, optimum shear rates can be readily determined. The self-supporting length of an extruded dispersion having, for example, 7.5% solids can decrease from 40 inches at a screw speed of 60 r.p.m. to 24 inches at 90 r.p.m. and 0 at about 110–120 r.p.m., thus indicating the desirability of using the lowest screw speed consistent with good mixing.

Adequate homogenization can be most readily achieved, while minimizing degradation, through the expedient of increasing the extruder barrel length. Increased heat transfer area for the dissipation of frictional heat appears to account, at least in part, for the low degree of degradation which is achieved.

EXAMPLE V

The process of Example II was followed, except that fresh beef hide, from which the hair layer and flesh-side impurities had been removed, was substituted for the beef tendon.

Again, an air-free viscous dispersion was obtained, which dispersion was sufficiently uniform in character to permit continuous extrusion through an 0.010 inch annular orifice to form a casing.

EXAMPLE VI

Limed beef hide of the type described in Example I, after removal of the grain layer, was saturated with a conventional tanner's sodium chloride and sulfuric acid pickling solution and then stored at 30° F. for about five months. The pickled beef hide was washed free of pickling solution with 4° C. water and then brushed on the flesh side to remove impurities. The clean hide was prepared by a chemical softening and pre-swelling process, which consists of the steps of (a) soaking for 15 days in an aqueous suspension of calcium hydroxide at 15° C.; (b) soaking for 9 hours in dilute hydrochloric acid (pH 1.0) at 15° C.; and (c) rinsing sufficiently with water to obtain a pH of 3.0 in the rinse water. The drained hide pieces were found to swell only moderately and still contained about 20% dry collagen solids and, therefore, represented a convenient raw material for later dilution to form the desired 6%–12% collagen dispersion.

Thus, it is possible to cause swelling fluid (dilute acid) to be imbibed uniformly into beef hide, in the presence of an excess of the swelling fluid. Beef tendons, on the other hand, tend to swell more under the same conditions and yield only 2%–7% solids, depending upon the size of the pieces used.

The above pre-swollen hide was then used in place of the fibrillated collagen of Example II. That is, the pre-swollen hide collagen in convenient pieces (e.g., about 1 inch square) was frozen and ground to a fibrous powder. This powder was then mechanically mixed in frozen particulate form with an additional quantity of the swelling fluid (dilute hydrochloric acid, pH 3.0) which had also been frozen and ground. The mixture was fed to a screw extruder followed by a slot filter as in Example I and the extrudate, which was a homogeneous dispersion of 12% hide collagen, was extruded through an 0.010 inch annular opening to form a casing.

EXAMPLE VII

Limed beef hide of the type described in Example I, after removal of the grain layer, was saturated with a conventional tanner's sodium chloride and sulfuric acid pickling solution and stored at 30° F. for about 3 months. The pickled hide was washed free of pickling solution with 4° C. water, and the flesh side removed by splitting. The process of Example VI was then followed except that the 1 inch squares of pre-swollen hide collagen were subdivided by mechanical and fluid shear to form a smooth dispersion in the following manner prior to freeze grinding: The pre-swollen hide was ground in a meat grinder, force through 0.004 inch slots (using a piston) and diluted in a sigma-blade dough mixer with the necessary additional swelling fluid to obtain a 12% hide collagen dispersion. This dispersion was then frozen, ground, and mixed with rayon flock for extrusion as in Example VI. In this case, the freezing-mixing process was used primarily to overcome the problems of mixing fibrous solid particles (rayon) with a normally viscous mass. The extruded casing had uniform distribution of the rayon in the casing.

EXAMPLE VIII

Limed beef hide of the type described in Example I, after removal of the grain layer and flesh layer by splitting, was saturated with a conventional tanner's sodium chloride and sulfuric acid pickling solution and stored at 30° F. for about 6 weeks. The pickled hide was cut into 4 inch squares and the washed with 4° C. water for 18 hours to remove the pickling solution. The washed hide squares were then soaked for 15 days in an aqueous suspension of calcium hydroxide at 15° C. Ten pounds of the hide were then cut into ¾ inch squares and washed with water for 1 hour, soaked for 9 hours in dilute hydrochloric acid (pH 1.0) at 3° C., and rinsed sufficiently with water to obtain a pH of 3.0 in the rinse water.

The acid-treated hide was then frozen. The grinding of the frozen hide, the freezing and grinding of the acid solution and the blending operation were carried out as described in Example I, except in that 7.4 lbs. (3360 gms.) of the frozen, powdered, acid solution and 0.61 lb. (276 gms.) of 3 denier, 1 mm. long rayon fiber were used in this blend instead of the corresponding ingredients in Example I.

The extrusion operation was carried out as described in Example I, except that the filtering device used following the screw extruder had 0.004 inch slots and the gear pump fed the dispersion to the extrusion die at a uniform rate of 9 cc./min.

The dispersion was extruded through a rotary die having an 0.011 inch annular orifice to produce a casing, ¾ inch in diameter. The casing was extruded into air and the casing moisture content was reduced by drying to a point wherein it could be reopened after passing through nip rolls.

The flattened tubing was re-inflated, air dried, and stored for one week. It was then washed in running water for 1 hour and dried again. It was then immersed in an 0.08% aqueous formaldehyde solution for 2 hours and dried again. It was immersed in a 10% aqueous solution of glycerine for 1 hour and dried again.

The casing was stuffed and fried as in Example I, with the same desirable results.

EXAMPLE IX

One hundred pounds (lbs.) of limed beef hide of the type described in Example I, after removal of grain layer and flesh layer by splitting, were cut into 8 inch wide strips varying in length from three to five feet. The strips were fed into a dicer. Execpt during the cutting step, the hide was refrigerated and protected to reduce degradation and dehydration. The diced hide (½ inch square) was treated with 7 lbs. of lime in 400 lbs. of water in a stainless steel tank for two weeks.

The limed hide was washed in a stainless steel tumbling washing machine at twelve r.p.m. for a total of 23 hours with 6 liters per minute running water overflow at 15° C. Fifty-five lbs. of the washed hide were partially swollen by soaking in a hydrochloric acid solution maintained at a pH of 1 for 6 hours at 15° C. in the same washing machine tumbling at 6 r.p.m. Water was then run through the system to raise the pH of the overflow to 2.25. The system was allowed to equilibrate for 16 hours during which time the washing machine revolved at 2 r.p.m. The final pH of the liquid was 2.05. The temperature was kept below 15° C. After draining, the acid treated hide weighed 76 lbs. It was frozen by mixing it with ground Dry Ice in a tumbler. The frozen hide was then ground in the presence of Dry Ice to a fine powder in a hammer mill employing a plate having $3/32$ inch holes. Water was frozen and ground in a rotary knife grinder using Dry Ice. 18.45 lbs. of the powdered hide and 18.45 lbs. of the powdered ice were blended with 303 gms. of a commercially obtained corn starch. The blending was carried out in a tumbler equipped with a high-speed agitator and cooled to prevent premature thawing of the frozen particles. The blend was stored in a freezer which was maintained at —25° C. to allow the Dry Ice to sublime. The proportions used were selected to produce a 9% dry collagen solids dispersion.

The frozen, ground, uniformly mixed blend of ice particles and collagen particles and starch was then fed to a screw extruder, such as one commonly used for extrusion of thermoplastic, the hopper section of which was maintained at a temperature of about —40° C. by circulating cold alcohol in the cooling jacket surrounding the feeding zone. The forward sections of the extruder were maintained at a temperature of about 5° C. thus permitting thawing while minimizing thermal degradation.

The screw conveyed the mixture of frozen particles forward to the thawing zone where de-aeration occurred, as in the case of plastic extrusion, in which the particles are thawed and joined with the viscous mass advancing through the extruder. This process occurs without air entrapment when the viscous mass completely fills the cavity back to the thawing zone, as it does when the output of the extruder is restricted (by a metering pump, valve, or constricted metering zone) so that a back pressure is created. The mixing and shearing action of the screw provided homogenization of the resultant, highly viscous dispersion without air entrapment. The resultant mass was translucent and did not have the variable opacity associated with the usual non-uniformly swollen dispersions. The uniform swelling of the collagen is attributable to the uniform distribution of the swelling agent prior to initiating the swelling action (at the time of thawing).

A filering device, in which the dispersion is forced through 0.003 inch slots, was used following the screw extruder. This device served to remove any foreign particles and to remove or shred apart any lumps which might clog the extrusion nozzle. A gear pump (following the filtering device) was used to meter the dispersion out of the extruder-filter system and feed it to an extrusion die at a uniform rate of 49 cubic centimeters/minute (cc./min.).

The dispersion was extruded through a rotary die having an 0.006 inch annular orifice to produce a casing 0.96 inch in diameter. The casing was extruded into air. The casing moisture content was reduced to a point wherein it could be reopened after passing through nip rolls. The flattened tubing, after passing through nip rolls, was neutralized with ammonium hydroxide, pH 10.8, for about 1.5 min., washed with cold running water for about 10 minutes, and thereafter glycerinated (6.4% glycerine in water for about 3 min.) to obtain a concentration of 25% by weight of glycerine in the finished film. The tubing was dried in the inflated state and, after drying, had an average wall thickness of about 0.0015 inch. To further harden the dried casing, it was heated at 70° C. for 20 hours.

The casing was then stuffed with standard commercial pork sausage, and then fried in a covered electric fry pan in the following manner: Three tablespoons of water were added to the cold fry pan, the sausages were placed in the pan and covered. The pan was then heated to 285° F. and, after five minutes, the cover was removed. The sausages were turned in the pan until brown. During frying, the casing did not split, nor was meat exposed or extruded from the ends of the individual encased sausage. The casing conformed to the meat to result in a pleasing, attractive product. No flavor was imparted to the sausage by the casing. The casing was readily comestible with the meat.

The principle of the invention, in addition to being applicable to the production of high solids concentration swollen collagen blends, is applicable to processes in general in which the intimate mixing of a plurality of materials is hampered because one or more of the materials is of high viscosity, or wherein the materials combine to form a viscous mass. Thus, the principles of the invention can be applied to the production of concentrated solutions of such materials as viscose or water soluble polymers. For example, cellulose xanthate in particulate form can be frozen and intimately mixed with the frozen particles of an alkali solution and the frozen, particulate blend thawed, under controlled conditions, to produce a viscous, air-free solution. Similarly, finely divided, water soluble polymers such as polyvinyl alcohol can be mixed with ice particles and the ice particles can thereafter be thawed to produce a viscous, aqueous solution. Other, specific applications to which the principles of the invention can be applied will occur to those skilled in the art. The proportions of materials used in such applications will, of course, be determined by the nature and type of characteristics desired or required in the final product.

As previously noted with regard to collagen, the freeze-mixing operation is applicable to processes, in general, in which absorbent, soluble, reactive or wettable materials are to be incorporated with other materials to obtain a highly viscous and/or air-free composition.

The uniform distribution of a re-enforcing agent, as for example, synthetic fibers, in a viscose solution can be readily attained by freezing the viscose solution, comminuting the frozen viscose in order to form free-flowing particles and then mixing the reenforcing agent with the frozen viscose particles until a uniform distribution of the particles is attained. The viscose agent blend can then be thawed and processed in the manner normally employed for viscose.

The term "liquid" as employed herein, refers to materials which have a consistency such that they take the shape but not the volume of a container in which they are held, and are substantially incompressible fluids. The liquids include materials having the consistency of dough, water, gel, slurrys, suspensions and the like.

Although the present invention has been set forth with particularity and described in some detail, it should be understood that changes, modifications and alterations can be made therein without departing from the scope of the invention.

What is claimed is:

1. A process for obtaining a homogeneously mixed viscose composition from a plurality of materials at least two of which are cellulose xanthate and a liquid agent which is, when in the liquid form, normally reactive with cellulose xanthate, which process includes the steps of:
   (a) freezing said liquid agent and forming free-flowing, inactive particles thereof;
   (b) mixing cellulose xanthate particles with said frozen, inactive, particulate agent until a uniform, inactive mixture is obtained; and
   (c) thawing said frozen, inactive, particulate agent such that the components of the uniform mixture are permitted to react and a homogeneously mixed viscose composition is obtained therefrom.

2. The process of claim 1 wherein said liquid agent is an alkali solution.

3. The process of claim 1 wherein said liquid agent is water.

4. A composition of matter obtained from a uniform blend consisting essentially of solid, free-flowing particles of cellulose xanthate and frozen, free-flowing particles of an alkali solution, the relative proportions of said particles being such that, upon thawing, a substantially homogeneous, extrudable viscose composition is obtained.

5. A process for obtaining a homogeneous viscose solution containing reinforcing agents including the steps of:
   (a) freezing a viscose solution and forming free-flowing solid particles thereof; and
   (b) mixing said frozen viscose particles with a reinforcing agent until a uniform mixture of reinforcing agent and frozen viscose particles is attained.

6. The process of claim 5 wherein said reinforcing agent is a synthetic fiber.

References Cited

UNITED STATES PATENTS 2,310,969   2/1943   Lilienfield _____ 106—164

THEODORE MORRIS, Primary Examiner

U.S. Cl. X.R.

99—176; 264—188